A. ROTH, Jr.
SHOE CALK ATTACHMENT.
APPLICATION FILED JAN. 18, 1910.
956,177.
Patented Apr. 26, 1910.
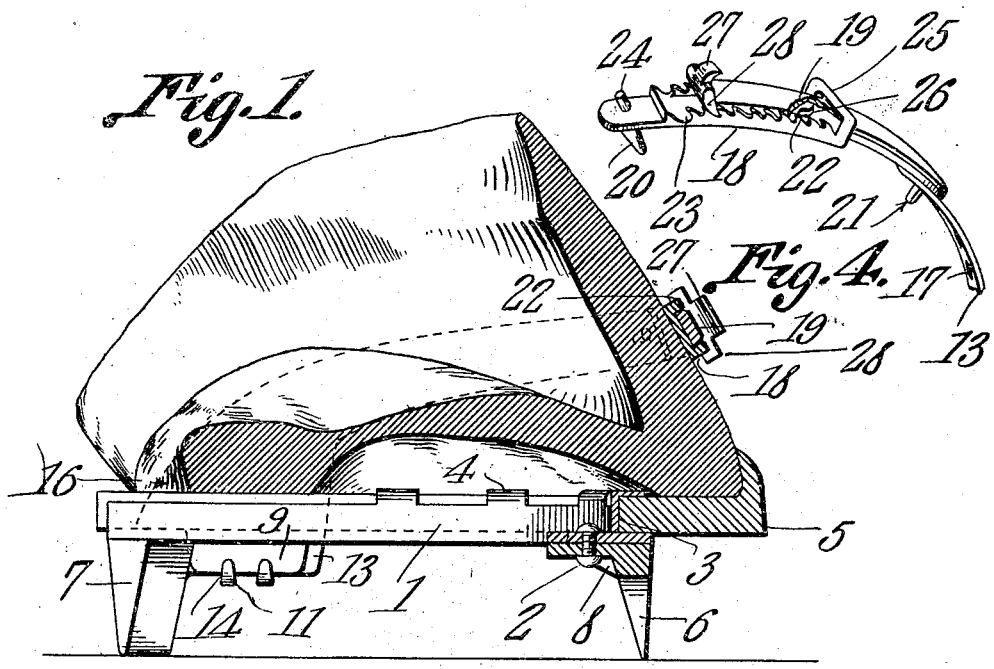
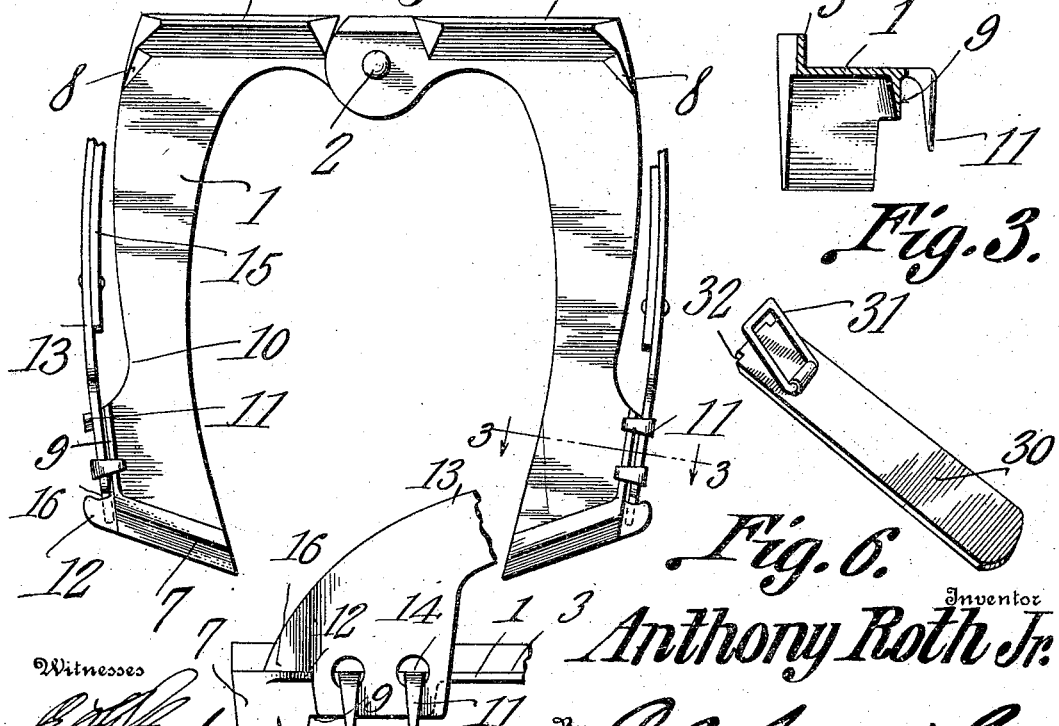
Inventor
Anthony Roth Jr.

UNITED STATES PATENT OFFICE.

ANTHONY ROTH, JR., OF NEW BRUNSWICK, NEW JERSEY.

SHOE-CALK ATTACHMENT.

956,177.

Specification of Letters Patent.

Patented Apr. 26, 1910.

Application filed January 18, 1910. Serial No. 538,684.

*To all whom it may concern:*

Be it known that I, ANTHONY ROTH, Jr., a citizen of the United States, residing at New Brunswick, in the county of Middlesex and State of New Jersey, have invented a new and useful Shoe-Calk Attachment, of which the following is a specification.

This invention has relation to calk attachments and it consists in the novel construction and arrangement of its parts hereinafter shown and described.

The object of the invention is to provide a calk attachment consisting of members of peculiar configuration pivotally connected together and provided with means for securely holding the same upon a shoe and hoof of an animal and each of the said members is provided with permanent calks of peculiar arrangement. In the present instance the means for holding the attachment in place upon the shoe and hoof of the animal includes metallic strips which possess a certain amount of flexibility and which are hingedly connected with the said members in such manner that when their ends are secured together they are prevented from riding up over the thinner front portion of the hoof and thereby contracting the same. The said strips are also so positioned upon the members that the forward side portions of the shoe upon the hoof may project laterally over the forward side portions of the said members and thus the attachment may fit the shoe irrespective of the distance between the side portions of the same at the forward end of the shoe; it being understood that animals have hoofs of different widths and the shoe when applied must be contracted or expanded accordingly in order to fit the hoof.

A further object of the invention is to provide a simple and effective clamp device for holding the ends of the said strips together provision being made for adjustably securing the said devices in the strips whereby the calk attachment may snugly fit hoofs which differ in circumference.

In the accompanying drawings,—Figure 1 is a vertical sectional view through a hoof showing a shoe applied thereto and the calk attachment applied to the shoe. Fig. 2 is a bottom plan view of the calk attachment with parts broken away. Fig. 3 is a transverse sectional view of the calk attachment cut on the line 3—3 of Fig. 2. Fig. 4 is a perspective view of the clasp devices used for securing the ends of the strips together. Fig. 5 is a side elevation of the rear portion of the attachment. Fig. 6 is a perspective view of an implement especially designed to be used in connection with the clasp device for effectually closing the same.

The shoe calk attachment consists of the side members 1 which are pivotally connected together at their forward ends as at 2. Each member is provided at its inner end with an upstanding flange 3 and tangs 4 are formed at the upper edges of the said flanges 3. The flanges 3 are adapted to fit snugly against the inner edge of the shoe 5 and the tangs 4 project over the upper surface thereof in the manner illustrated in Fig. 1 of the drawings. Toe calks 6 are formed at the forward ends of the members 1 and heel calks 7 are formed at the rear ends of the said members. The said calks 6 and 7 are permanent or integral with the respective members upon which they are mounted and are approximately V shaped in transverse section. Calks 8 are located at the side edges of the forward portions of the members 1 and at the outer edges of the said members. The said calks 8 join at their forward ends with the calks 6 and have inclined edges extending from the rear sides of the calks 6 to the plane of the under sides of the members 1. The calks 8 are designed to prevent lateral slip of the shoe to which the attachment is applied and hold the forward portion of the hoof of the animal in proper contact with the foundation over which it is traveling. The calks 8 are also approximately V shaped in transverse section. Calks 9 are formed at the outer rear edges of the members 1 and at their rear ends join with the outer ends of the calks 7 located at the rear ends of the said members 1. The calks 9 are approximately V shaped in transverse section but the lower edges of the said calks are approximately parallel with the under surfaces of the members 1. The outer portion of each member 1 between the calks 8 and 9 is cut away as at 10 so that the outer edge portion of the permanent shoe 3 may project beyond the outer edges of the said members 1 and thus prevent the intermediate outer edge portion of the said members 1 from being brought in contact with the side of another hoof of the animal (commonly known as interference) and from being forced laterally out of place.

Tongues 11 are formed at the outer rear edge portions of the members 1 in the vicinity of the calks 9 and outstanding lugs 12 are formed at the outer rear end portions of the said members 1 at the points behind the tongues 11.

Metallic strips 13 are provided at their rear ends with perforations 14 which receive the tongues 11. The said tongues 11 after passing through the said openings 14 are bent around against the lower edges of the calks 9. Strips of leather or other flexible material 15 are attached to the inner sides of the strips 13 and are adapted to bear against the outer surface of the forward portion of the hoof of the animal. Each strip 13 is provided at its rear end with an extremity 16 which is adapted to bear against the upper surface of the lug 12 carried by the same member 1 to which the said strip is attached to, the said extremity 16 bearing against the lug 12 to prevent the forward portion of the strip 13 from having a tendency to work up over the thin portion of the hoof of the animal. The strips 13 are provided at their forward ends with perforations 17 arranged in a series upon the strip and extending longitudinally thereof.

A clasp device of special construction is provided for securing the forward end of the said strips 13 together and therefore firmly binding the parts of the attachment upon the shoe of the animal. Said clasp device consists of members 18 and 19 which are provided with pins 20 and 21, respectively, and the said pins are adapted to engage the perforations 17 at the forward ends of the strips 13. Teeth 22 are formed at the longitudinal edges of the member 18 and a notch 23 is provided in the member 18 at the ends of the sets of teeth 22. A pin 24 is also located upon that end portion of the member 18 at which the pin 20 is located but upon the opposite side of the said member. At its outer end the member 18 is provided with a bar 25 which is located at the opposite ends of the set of teeth 22 from the recess 23. A recess 26 is provided in the end portion of the member 18 under the bar 25 and inasmuch as the member 19 lies upon the member 18 and under the bar 25 the recess 26 forms an opening through which the pin 21 may be passed when the member 19 is applied to the member 18 or detached therefrom. A hook 27 is formed upon the outer side of the member 19 at the end thereof opposite the end which carries the pin 21 and pawls 28 are formed upon the end portion of the member 19 adjacent the hook 27 and are adapted to engage the teeth 22. The said pawls may also enter the recess 23 formed in the member 18 at the ends of the set of teeth 22.

For operating the members 18 and 19 of the clasp device an implement of especial construction as shown in Fig. 6 of the drawing is provided. The said implement consists of a bar 30 having a loop 31 pivotally mounted upon one side in the vicinity of one end thereof and provided at the corners of that end adjacent the said loop with undercut shoulders 32.

In operation when the device as shown in Fig. 6 is used for the purpose of connecting the members 18 and 19 of the clamp device so that they will secure the ends of the strips 13 the shoulders 32 of the bar 30 are inserted in the spaces between the teeth 22 at the opposite sides of the member 18 and the bar 30 is used as a lever whereby the shoulders 32 are converted into fulcrums and the loop 31 is engaged with the hook 27 of the member 19 and the said member 19 is drawn along the member 18 until the pawls 28 arrive at the recess 23 when the said pawls are permitted to enter the said recess and the parts are secured together. At the final operation to cause the pawls 28 to enter the recess 23 the end portion of the bar 30 is engaged with the pin 24 and the said bar is swung as indicated when the pawls 28 are brought over the recess 23 and may be permitted to enter the same. To disconnect the end portions of the strips 13 from each other when it is desired to remove the attachment from the shoe an implement of any character as for instance a screw-driver may be inserted between the outer end of the member 1 and the strip 13 with which it is connected and by springing the said implement the pin 20 may be lifted out of the perforation in the strip 13 with which it is connected.

By reference to Fig. 1 of the drawings it will be seen that the forward end portions of the strips 13 are disposed at angles to the rear end portions thereof and therefore the clamp devices of which the members 18 and 19 form component parts will be positioned upon the lower thickened portion of the hoof when the attachment is applied and by reason of the configuration of the strips 13 the said clamp members will be so held and consequently the same will not be upon the thin portion of the shell of the hoof and thus the present reattachment upon the shoe will not have a tendency to contract the hoof.

Having described the invention what I claim as new and desire to secure by Letters Patent is:—

A shoe attachment comprising members pivoted together, calks carried by said members, strips hingedly connected with the members, a clasp device comprising members slidably engaging each other and each having a pin adapted to engage one of said strips, one of the members of the clasp device having at its edge a series of teeth and a recess provided at the end of said series and a bar spaced from the member and located at the other end of the series of teeth, the other clasp member having a pawl adapted to engage the teeth and the recess and a hook extremity.

In testimony that I claim the foregoing as my own, I have hereto affixed my signature in the presence of two witnesses.

ANTHONY ROTH, Jr.

Witnesses:
 LOUIS WOLFSON,
 GEORGE J. PLECHNER.